Patented Sept. 29, 1936

2,056,107

UNITED STATES PATENT OFFICE 2,056,107

PELLETED FEED AND METHOD OF MAKING SAME

Clarence E. Lee, Auburn, N. Y., assignor to The Beacon Milling Company, Incorporated, Cayuga, N. Y., a corporation of New York No Drawing. Application September 17, 1935, Serial No. 40,908

10 Claims. (Cl. 99—4)

This invention relates to a pelleted feed which, although of value as a feed for various mammals, including rabbits, dogs, calves, etc. is of particular value as poultry or fowl feed in that it is rich in nutriment and tends to build up the resistance of poultry or fowl against coccidiosis as well as to alleviate a condition of coccidiosis, if one already exists.

The feed of the present invention comprises digestible albuminous solids or solids rich in albumen, preferably dried milk solids, mixed or blended with ground grain or a grain mixture. The ground grain or grain mixture is desired for its nutritive value and for offsetting the possible ill effect, especially on poultry, of the dried milk solids or equivalent protein-concentrated albuminous solids, if consumed alone. The dried milk solids not only have high nutritive value but have been found to exert a tonic effect on poultry, their action apparently being that of stimulating a flushing-out of such coccidiosis organisms as are loose in the intestinal tract and thus avoiding such damage as might ensue if they remained therein. In this connection, it might be observed that coccidiosis is one of the most serious poultry diseases by reason of the fact that the disease organisms are apt to burrow into and embed themselves in the intestinal tract and multiply therein, sometimes causing rupture of blood vessels and hemorrhage and/or scarring of the tissues so as to impair their food-assimilating function.

When it is attempted to pellet feeds of the foregoing composition, e. g., a mixture of ground grain and milk solids, serious difficulty arises because of the tendency of the milk solids to gum and clog the orifices of the plates or dies through which the composition is extruded as rod-like bodies and cut in the course of extrusion into pellets. This is especially true when the milk solids content of the feed is high, say, 30% to 40% or greater, insomuch that the feed cannot be run satisfactorily through the usual commercial pelleting machines. It is probably the case that under the pressure and frictional heat developed during extrusion, the albumen content of milk undergoes polymerization or resinification into gummy or horn-like products next to the orifice walls, accumulating on and fouling the walls so as to impede or prevent extrusion.

I have discovered that if a small proportion of suitable oleaginous medium is appropriately incorporated into the feed composition preparatory to its pelleting, it is possible to overcome completely the aforementioned gumming troubles even in the case of feed compositions containing by weight 40% or more of milk solids and at the same time to realize satisfactory pellet formation without detracting from the values sought to be derived from the pellets. While various oleaginous media might be used for this purpose, I have found it particularly desirable to employ white mineral oils. I have worked successfully with U. S. P. extra-heavy Russian mineral oils as well as extra-heavy, heavy, medium and light American mineral oils, but I prefer to use the so-called technical grade of light American mineral oil, as such oil is economical and the small percentage of impurities present therein have practically no ill effect on the quality of the resulting pellets. Aside from the function performed by the mineral oil in inhibiting gumming or fouling of the pelleting machine through which the composition is run, it has a beneficial laxative effect on the poultry or on mammals fed with the resulting pellets. Being stable, the mineral oil does not affect the stability of the pellets; and, being substantially tasteless and odorless, it does not affect their palatability. For the purpose of the present invention, mineral oil thus possesses advantages over the ordinary vegetable or animal oils, which may have one or more such faults as objectionable taste and tendency toward oxidation, rancidity, or other undesirable spontaneous change. However, it is possible to use vegetable or animal oils, particularly such substantially stable oils as castor, in lieu of part or all of the mineral oil.

I shall now describe a typical example of procedure which may be adopted pursuant to the present invention. A mixing machine, such as a Howe, Monarch, Day, or Werner and Pfleiderer mixer, is charged with suitable grain or grain mixture or constituents thereof, such as corn, oats, barley, rye, buckwheat, kaffir corn, wheat bran, rice bran, and hulls of cotton seed, of oats, or the like associated with more or less of the berry or kernel. Dried milk solids are also added to the machine, for instance, dried skim or whole milk solids, dried buttermilk, or milk albumen together with, if desired, some milk sugar. Accordingly, the expression "dried milk solids" as used herein means one or more of such milk solids as have been mentioned or their equivalents that are derived from milk in the form of whole milk, skim milk, buttermilk, or the like. While the mixer is in operation, the mineral oil is added to the ingredients as they are being mixed, preferably in the form of a spray so as to minimize the time required to ensure a substantially uniform dissemination of the oil throughout the mixed or blended ingredients. As already indicated, the oil is preferably a technical grade light American oil; and such an oil diffuses rapidly and substantially uniformly throughout the mixer charge as it is being sprayed onto the charge with the mixer in operation. While various proportions of ingredients might be employed, a formulation or composition to be recommended for poultry feeding is one containing by weight, say, 40% of dried skim milk solids, 57% of ground grains, and 3% of mineral oil. The resulting mixture or blend may be delivered to the pelleting machine and formed into pellets of cylindrical, disc or square form of a thickness and diameter of, say, about 1/16 to 3/16 inches in the case of chickens, and about 1/4 to 1/2 inches in the case of larger fowl such as turkeys. Of course, pellets of any other size, depending on the creature to be fed therewith, may be produced from the composition. No trouble is encountered in pelleting the mixture or blend in the usual commercial pelleting machines.

The proportionality of the various ingredients in the foregoing example is subject to variation. Thus, the proportion of milk solids employed may range from, say, 15% to 60% by weight of the finished composition and the proportion of ground grain correspondingly varied. Such materials as wheat, oat, or barley middlings, wheat or barley flour, dehydrated vegetables, such as carrots, lettuce, spinach, etc. may be used to replace a portion of the ground grain or constituents thereof. The percentage of oil is also subject to variation, depending, for example, on such characteristics as its viscosity and upon the proportion of dried milk solids employed in the composition. Thus, in the case of a feed composition containing only about 15% by weight of milk solids, the presence therein of only about 1% by weight of light mineral oil may suffice to inhibit gumming of the composition during its pelleting, whereas, in the case of feed compositions of 40% or higher milk solids content by weight, it may be advantageous to have present therein more than 3% by weight of mineral oil, for instance, up to about 15% of mineral oil. However, at 40% milk solids content only about 3% of mineral oil suffices to accomplish the desired results; and in any event, that is, even in the case of feed compositions of greater than 40% milk solids content, it is generally undesirable to go to a mineral oil usage of greater than about 15% on account of the excessive laxative action of a greater amount and its tendency to ooze from the resulting pellets.

The oil may, of course, be added at once to the mixture or blend of ground grain and dried milk solids and worked substantially uniformly into the mixture as it is undergoing mixing action. However, as already indicated, a progressive spraying of the oil onto the ingredients as they are being mixed leads to the desired substantially homogeneous blend in a short period of time. It is, of course, possible to incorporate the oil into either the ground grain or dried milk solids before they are blended in the mixer.

It is possible to replace part or all of the dried milk solids in feed compositions of the present invention by other digestible albuminous solids or solids rich in albumen, particularly when a suitable laxative or cathartic such as epsom salts, is admixed therewith. Typical of such other albuminous solids may be mentioned dried eggs, blood albumen, and gelatine.

I claim:—

1. A feed in extruded pellet form comprising dried milk solids in the amount of at least about 15% and an oleaginous medium in the amount of at least about 1%.

2. A feed in extruded pellet form comprising dried milk solids in the amount of at least about 15% and mineral oil in the amount of at least about 1%.

3. A feed in extruded pellet form comprising a blend of ground grain, dried milk solids in the amount of at least about 15%, and an oleaginous medium in the amount of at least about 1%.

4. A feed in extruded pellet form comprising a blend of ground grain, dried milk solids in the amount of at least about 15%, and mineral oil in the amount of at least about 1%.

5. A feed in extruded pellet form comprising a blend of ground grain, dried milk solids, and an oleaginous medium, the dried milk solids content of said blend being about 15% to 60% and the oleaginous medium content of said blend being about 1% to 15%.

6. A feed in extruded pellet form comprising a blend of ground grain, dried milk solids, and mineral oil, the dried milk solids content of said blend being about 15% to 60% and the mineral oil content of said blend being about 1% to 15%.

7. A method of preparing a feed composition in extruded pellet form, which comprises substantially uniformly incorporating an oleaginous medium into a mixture of ground grain and dried milk solids with such proportionality of the ingredients as to produce a composition containing about 15% to 60% of milk solids and about 1% to 15% of oleaginous medium, extruding the resulting composition through orifices, and cutting the extruded bodies into pellets, said oleaginous medium serving to maintain said orifices in substantially unclogged condition.

8. A method of preparing a feed composition in extruded pellet form, which comprises progressively spraying an oleaginous medium into a mixture of ground grain and dried milk solids as the mixture is undergoing mixing action and with such proportionality of the ingredients as to produce a composition containing about 15% to 60% of milk solids and about 1% to 15% of oleaginous medium, extruding the resulting composition through orifices, and cutting the extruded bodies into pellets, said oleaginous medium serving to maintain said orifices in substantially unclogged condition.

9. A method of preparing a feed composition in extruded pellet form, which comprises admixing an oleaginous medium substantially uniformly with a feed composition comprising dried milk solids to produce a resultant composition of at least about 15% dried milk solids content and about 1% oleaginous medium content, extruding the resultant composition through orifices, and cutting the extruded bodies into pellets, said oleaginous medium serving to maintain said orifices in substantially unclogged condition.

10. A method of preparing a feed composition in extruded pellet form, which comprises substantially uniformly incorporating mineral oil into a mixture of ground grain and dried milk solids with such proportionality of the ingredients as to produce a composition containing at least about 15% dried milk solids and about 1% mineral oil, extruding the resulting composition through orifices, and cutting the extruded bodies into pellets, said mineral oil serving to maintain said orifices in substantially unclogged condition.

CLARENCE E. LEE.